United States Patent [19]

Niebrzydoski

[11] Patent Number: 5,398,654
[45] Date of Patent: Mar. 21, 1995

[54] FUEL INJECTION SYSTEM FOR INTERNAL COMBUSTION ENGINES

[75] Inventor: John L. Niebrzydoski, Cass City, Mich.

[73] Assignee: Orbital Fluid Technologies, Inc., Cass City, Mich.

[21] Appl. No.: 222,439

[22] Filed: Apr. 4, 1994

[51] Int. Cl.⁶ .......................... F02M 7/00; F02B 33/04
[52] U.S. Cl. .................... 123/445; 123/73 C; 251/65
[58] Field of Search ............... 123/472, 445, 446, 467, 123/497, 533, 73 B, 73 C; 251/65

[56] References Cited

U.S. PATENT DOCUMENTS

| | | | |
|---|---|---|---|
| 2,908,259 | 10/1959 | Milleville | 123/473 |
| 5,048,489 | 9/1991 | Fischer et al. | 123/467 |
| 5,052,429 | 10/1991 | Yoo | 251/65 |
| 5,156,133 | 10/1992 | Sugimoto et al. | 123/533 |
| 5,315,968 | 5/1994 | Niebrzydoski | 123/73 C |

*Primary Examiner*—E. Rollins Cross
*Assistant Examiner*—Thomas N. Moulis

*Attorney, Agent, or Firm*—Barnes, Kisselle, Raisch, Choate, Whittemore & Hulbert

[57] ABSTRACT

A fuel injection system that includes an injector having a pintle movable within a housing for selectively opening and closing communication between inlet and outlet ports in the housing. The inlet port is connected to a source of fuel under pressure, while the outlet port is connected to a nozzle for delivering fuel under pressure to the engine. A section of magnetic material is coupled to the pintle, and a permanent magnet is mounted on the engine flywheel, such that magnetic forces imparted as the permanent magnet moves therepast moves the pintle against a spring to open communication between the inlet and outlet ports, and thereby deliver fuel under pressure from the source to the nozzle. A cam mechanism is rotatably positioned within the pintle housing and operatively coupled to the pintle for adjustably varying stroke of the pintle within the housing, and thereby varying time duration during which the injector opens communication between the fuel source and the nozzle.

13 Claims, 3 Drawing Sheets

FUEL INJECTION SYSTEM FOR INTERNAL COMBUSTION ENGINES

The present invention is directed to fuel injection systems for internal combustion engines, and more particularly to a new and improved fuel injector construction.

BACKGROUND AND SUMMARY OF THE INVENTION

Conventional fuel injection systems for two-stroke and four-stroke internal combustion engines include either a poppet injector responsive to fuel pressure for opening the injector or an electromagnetic injector responsive to application of electrical energy to open the injector. In both cases, the injector construction is expensive and subject to failure during operation. It is therefore a general object of the present invention to provide a fuel injection system for an internal combustion engine that features an improved injector construction.

A fuel injection system in accordance with a presently preferred embodiment of the invention includes an injector having a housing with inlet and outlet ports, and a pintle movable within the housing for selectively opening and closing communication between the inlet and outlet port. The inlet port is connected to a source of fuel under pressure, while the outlet port is connected to a nozzle for delivering fuel under pressure to the engine. First magnetic material is coupled to the pintle, and second magnetic material is mounted for motion adjacent to the first magnetic material in synchronism with operation of the engine, such that magnetic forces imparted on the first magnetic material as the second magnetic material moves therepast moves the pintle to open communication between the inlet and outlet ports, and thereby delivers fuel under pressure from the source to the nozzle. Magnets that attract each other or oppose each other may be employed depending upon desired nozzle configuration. Opposing magnets are disclosed for purposes of explanation herein. In the preferred embodiment of the invention, a cam mechanism is rotatably positioned within the pintle housing and operatively coupled to the pintle for adjustably varying stroke of the pintle within the housing, and thereby varying time duration during which the injector opens communication between the fuel source and the nozzle.

In various embodiments of the invention, the injector nozzle is disposed in the transfer port of a two-stroke engine, in the combustion cylinder of the engine for direct fuel injection, or in the air intake manifold of a ported engine for indirect fuel injection. An air pump may deliver pulsations of air under pressure to the injector nozzle to assist atomization of the fuel. In the preferred embodiments of the invention, the second magnet is mounted on the engine flywheel, and the pintle housing, or both the pintle housing and the air pump, are mounted on the engine crankcase externally adjacent to the flywheel and responsive to passage of the flywheel-mounted magnet for delivering air and/or fuel pulses to the injector nozzle.

BRIEF DESCRIPTION OF THE DRAWINGS

The invention, together with additional objects, features and advantages thereof, will be best understood from the following description, the appended claims and the accompanying drawings in which:

Figure 1:
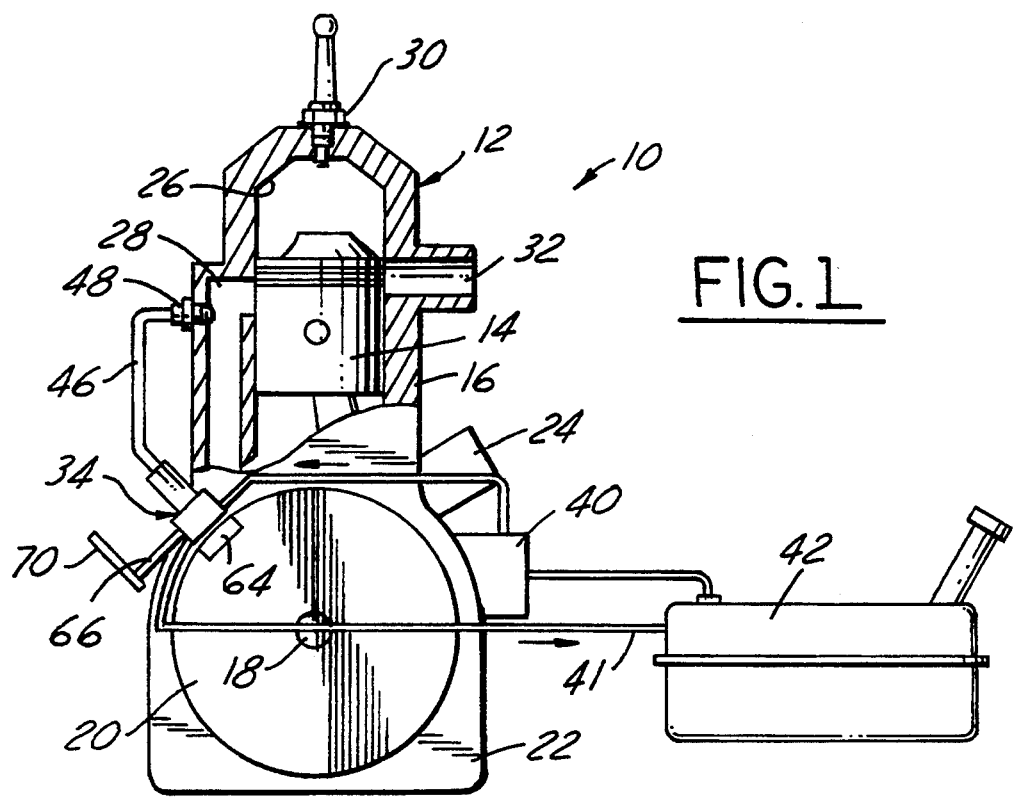
FIG. 1 is a schematic diagram of a fuel injection system in accordance with one presently preferred embodiment of the invention.
Figure 2:
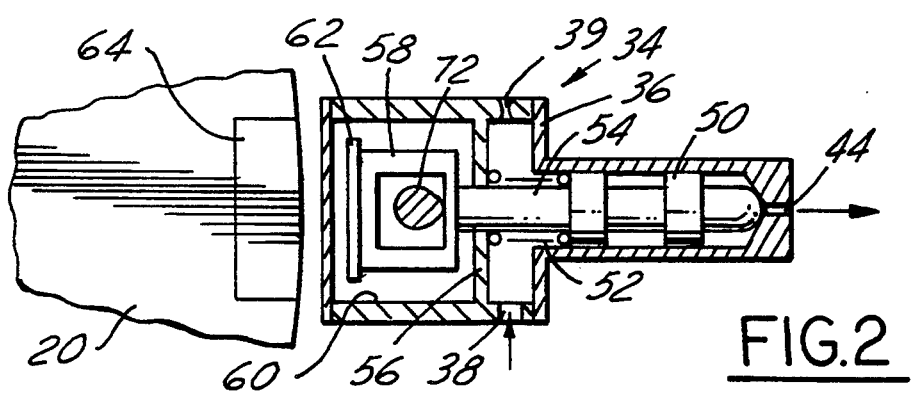
Figure 3:
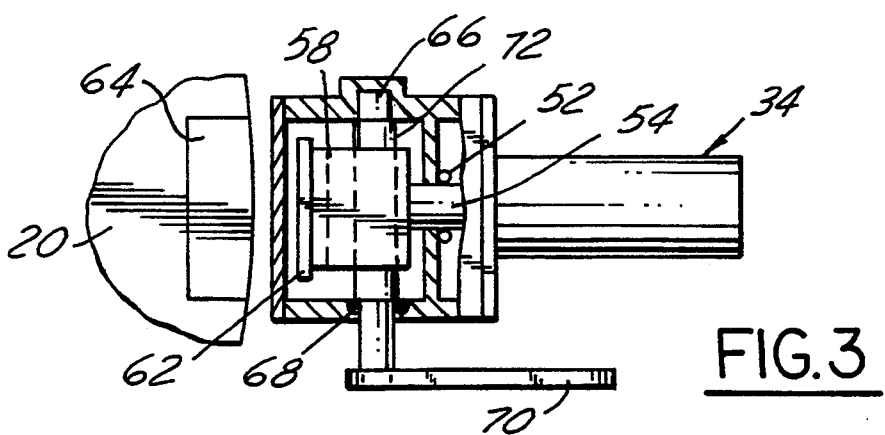
Figure 4A:
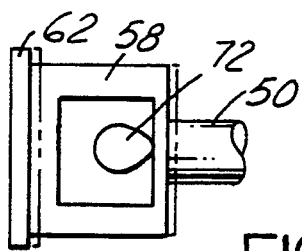
Figure 4B:
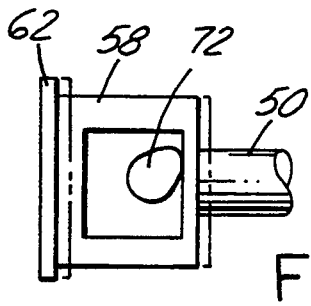
Figure 4C:
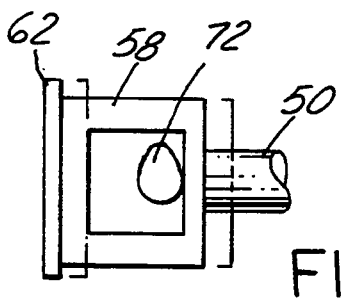

PIG. 2 is a sectional view of the fuel injector illustrated in FIG. 1;

FIG. 3 is a plan view of the injector illustrated in FIG. 2;

FIGS. 4A–4C are fragmentary views that illustrate operation of the injector illustrated in FIGS. 2–3; and FIGS. 5–8 are schematic diagrams that illustrate respective modifications to the fuel injection system illustrated in FIG. 1.

DETAILED DESCRIPTION OF PREFERRED EMBODIMENTS

FIG. 1 illustrates a fuel delivery system 10 for a two-stroke engine 12 having at least one piston 14 reciprocable within an associated cylinder 16. Piston 14 is coupled to a crankshaft 18 on which a flywheel 20 is mounted within the engine crankcase 22. Combustion air is drawn through a reed valve (not shown) within an air intake port 24, and delivered to the combustion chamber 26 through a transfer port 28. The fuel/air mixture is ignited by a spark plug 30, and the spent fuel is exhausted through a cylinder port 32. To the extent thus far described, engine 12 and fuel delivery system 10 are of generally conventional piston-ported construction.

In accordance with the present invention, a fuel injector 34 is mounted on engine crankcase 22 externally adjacent to engine flywheel 20. Injector 34 includes a housing 36 having an intake port 38 connected to a fuel pump 40 that delivers fuel under pressure from a fuel tank 42. An outlet port 44 in housing 36 is connected by a conduit 46 to a nozzle 48 that is disposed at transfer port 28 for injecting fuel into the combustion air as the latter is fed into combustion chamber 26. A pintle 50 is slidably disposed within housing 36, and is biased by a coil spring 52 against an internal seat at outlet port 44 for normally closing communication between fuel pump 40 and nozzle 48. The shaft 54 of pintle 50 extends through an internal wall or septum 56 of housing 36, and is coupled to a yoke 58 disposed within a pintle housing chamber 60. A piston 62 of magnetic material is mounted on yoke 58 remotely of pintle shaft 54, and is positioned within housing 36 so as to be externally adjacent to flywheel 20. A permanent magnet 64 is mounted at the periphery of flywheel 20 so as to rotate in synchronism with operation of engine 12.

A shaft 66 extends through yoke 58 within chamber 60, and projects through a sealed opening 68. An arm 70 is mounted on shaft 66 externally of injector housing 36 for coupling to an accelerator pedal or the like responsive to an operator for varying engine demand. A cam lobe 72 internally engages yoke 58 of pintle 50, which variably limits the stroke of the pintle within housing 36, and thereby varies time during which the fuel injector is open to deliver fuel under pressure from pump 40 to nozzle 48. An orifice 39 in the sidewall of injector housing 36 is connected to a line 41 to return excess fuel to tank 42, and to elminate/purge vapors that may form during hot operation.

Fuel pump 40 in the preferred embodiment of the invention is of the type disclosed in U.S. Ser. No. 08/038,828, filed Mar. 29, 1993 and assigned to the assignee hereof. The fuel pump 40 includes a diaphragm operatively coupled to magnet 64 on flywheel 20 and responsive to rotation of the flywheel to pump fuel to injector 34. When injector 34 is open, such pressurized fuel is delivered through nozzle 48 to transfer port 28, and thence to engine combustion chamber 26 when transfer port 28 is opened by piston 14. When engine 12 is at idle, shaft 66 and cam lobe 72 are rotated by arm 70 to engage yoke 58 and pintle 50 as illustrated in FIGS. 2 and 4A so as to limit stroke of the pintle and deliver minimum fuel to the engine. Thus, upon each passage of flywheel magnet 64 adjacent to piston 62, yoke 58 and pintle 50 move from the position shown in phantom in FIG. 4A to the position shown in solid to open communication between the injector inlet and outlet ports. Following passage of flywheel magnet 64, coil spring 52 moves pintle 50 to close outlet port 44. To increase quantity of fuel delivered to the engine, cam shaft 66 and lobe 72 are rotated by arm 70 to the position shown in FIG. 4B, such that stroke of piston 62, yoke 58 and pintle 50 is increased. FIG. 4C illustrates maximum stroke of pintle 50, and consequent maximum time duration of fuel delivery at the injector. Upon each reciprocation of pintle 50 within pintle housing 36, fuel under pressure is delivered from pump 40 to nozzle 48, with the quantity of fuel being a direct function of time duration of injector opening.

Figure 5:
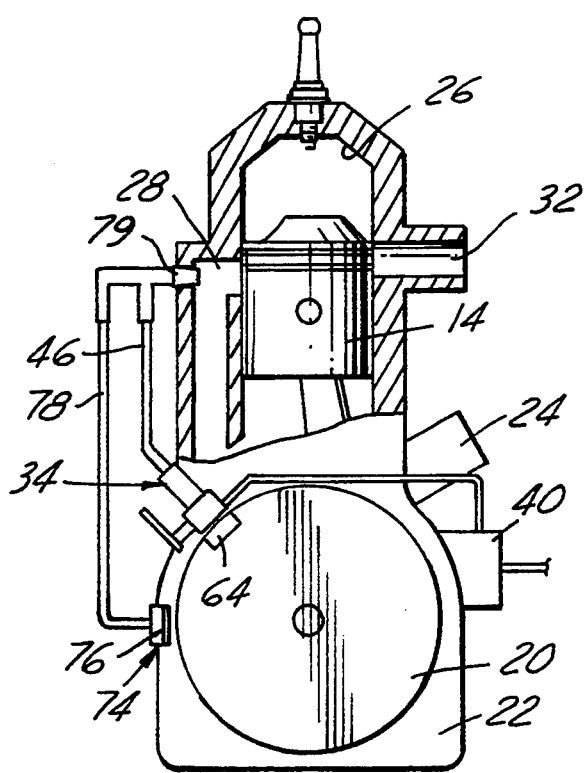

FIG. 5 illustrates a modification to the embodiment illustrated in FIG. 1 in which an air pump 74 is mounted on engine crankcase 22 externally adjacent to flywheel 20. Air pump 74 includes a diaphragm 76 with magnetic material responsive to passage of flywheel magnet 64 for delivering a pulse of air through a conduit 78 to an air/fuel injector nozzle 79 in parallel with delivery of fuel from injector 34. Such air pulses from pump 74 help atomize fuel delivered to transfer port 28, and thence to combustion chamber 26.

Figure 6:
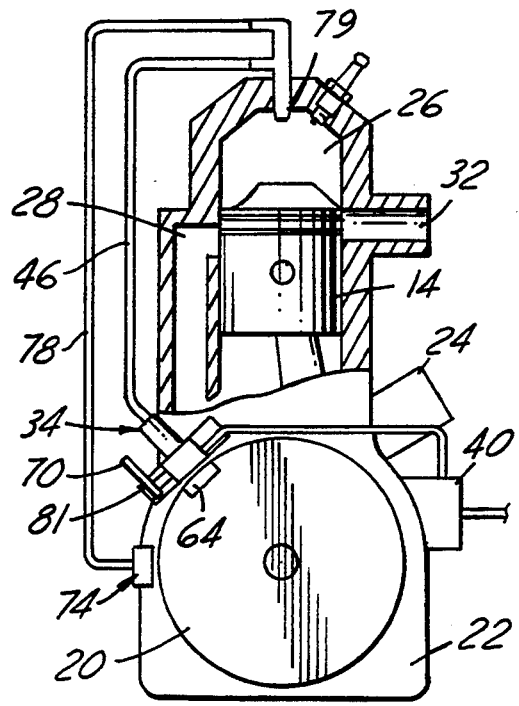

FIG. 6 illustrates a modification to FIG. 5 in which fuel/air nozzle 79 is disposed within or immediately adjacent to combustion chamber 26 for direct injection of fuel and fuel-atomizing air into the combustion chamber. Injector 34 in the modification of FIG. 6 is movably mounted on a bracket 81, which in turn is mounted on engine crankcase 22 adjacent to the periphery of flywheel 20. Injector 34 is operatively coupled to the operator throttle in such a way as to be movable on bracket 81 so as to advance or retard the timing of fuel injection in response to position of the throttle, and therefore in response to engine demand. Thus, under high load and/or high rpm conditions, the timing of fuel injection is advanced so as to provide sufficient time for complete fuel injection prior to ignition.

Figure 7:
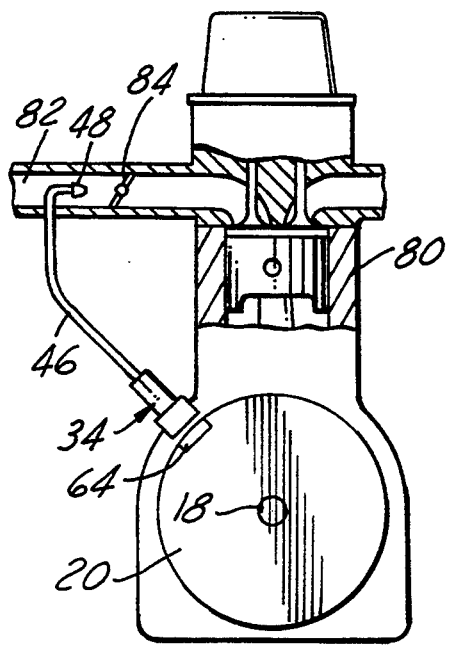
Figure 8:
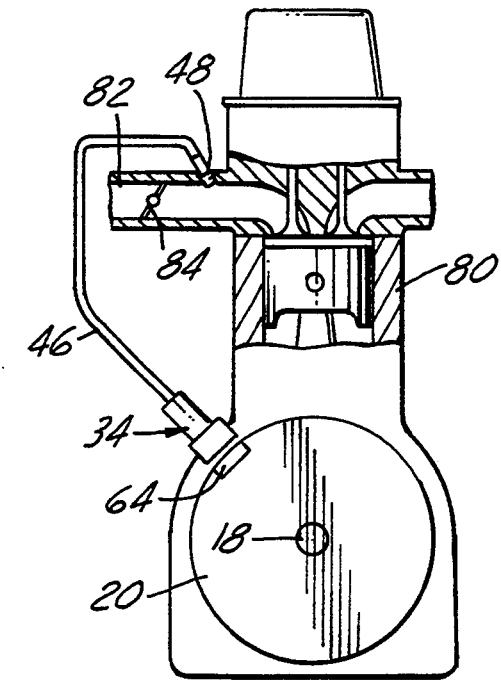

FIGS. 7 and 8 illustrated modified delivery systems for use in conjunction with ported four-stroke engine 80. In the engine, combustion air is delivered by an air intake manifold 82 and a throttle valve 84. In the modification to FIG. 7, injector nozzle 48 (or 79) is disposed within air intake manifold 82 upstream of throttle valve 84, while in the modification of FIG. 8 injector nozzle 48 (or 79) is disposed downstream of valve 84 within manifold 82.

Thus, in each embodiment, the fuel injector is directly responsive to reciprocation of the engine for delivering fuel under pressure to an injector nozzle. The injector includes a pintle with a piston of magnetic material responsive to rotation of a magnet on the engine flywheel for reciprocating the piston against a coil spring, and thereby opening communication through the injector from a fuel pump to the injector nozzle. A cam engages the pintle and is mounted on a shaft responsive to engine demand for varying stroke of the pintle within the injector housing, and thereby varying time during which the injector is open upon each passage of the flywheel magnet. The injector nozzle may be mounted in any number locations on the engine, and may be connected to a source of pressurized air pulses for atomizing fuel during the injection process.

I claim:

1. A fuel injection system for an internal combustion engine that comprises:
    injection means including an injector housing with inlet and outlet ports, and a pintle movable in said housing to open communication between said inlet and outlet ports,
    means for connecting said inlet port to a source of fuel under pressure,
    means including a nozzle coupled to said outlet port for delivering fuel under pressure to an engine,
    first magnetic means coupled to said pintle, and
    second magnetic means for mounting adjacent to said first magnetic means to move in synchronism with operation of the engine such that magnetic forces on said first means as said second means moves therepast moves said pintle to open communication between said inlet and outlet ports and thereby deliver fuel under pressure from said source to said nozzle.

2. The system set forth in claim 1 further comprising means within said injector housing coupled to said pintle for varying stroke of said pintle within said housing and thereby varying time of open communication between said ports responsive to said magnetic forces.

3. The system set forth in claim 2 wherein said stroke-varying means comprises means responsive to engine demand.

4. The system set forth in claim 2 wherein said stroke-varying means comprises a yoke on said pintle, a cam disposed within said yoke, and means for rotating said cam.

5. The system set forth in claim 4 wherein said first magnetic means is mounted on said yoke on a side thereof remote from said pintle.

6. The system set forth in claim 1 wherein said injector means further includes means within said housing resiliently urging said pintle to a position that closes communication between said ports.

7. The system set forth in claim 1 wherein said second magnetic means comprises a permanent magnet for mounting on a flywheel of the engine, said injector housing being adapted for mounting on a crankcase of the engine externally adjacent to the flywheel.

8. The system set forth in claim 7 wherein said engine comprises a piston-ported engine having a transfer port for delivering combustion air to a cylinder of the engine, and wherein said nozzle is disposed in said transfer port.

9. The system set forth in claim 7 wherein said nozzle is disposed in a cylinder of the engine for direct injection of fuel into the cylinder.

10. The system set forth in claim 7 wherein the engine comprises an air intake manifold, and wherein said nozzle is disposed in said air intake manifold for indirect injection of fuel into the engine.

11. The system set forth in claim 7 further comprising an air pump coupled to said nozzle for atomizing fuel delivered at said nozzle.

12. The system set forth in claim 11 wherein said air pump comprises means adapted for mounting on the engine crankcase externally adjacent to the flywheel and responsive to passage of said permanent magnet for pumping air to said nozzle.

13. The system set forth in claim 7 further comprising means operatively coupled to said injector housing and responsive to engine demand for selectively advancing and retarding timing of fuel ignition relative to reciprocation of the engine.

* * * * *